E. N. HILL.

Assignor to J. G. SLATER.

MEANS FOR INSURING TRAVELERS AGAINST LOSS BY ACCIDENT.

No. 11,270. Reissued Sept. 13, 1892.

Witnesses,
Chas. H. B. Baldwin.
Fletcher Johnston.

Inventor,
Ezra Nathaniel Hill.
By Robert Mason, Attorney.

THE NORRIS PETERS CO., PHOTO-LITHO., WASHINGTON, D. C.

UNITED STATES PATENT OFFICE.

EZRA NATHANIEL HILL, OF WASHINGTON, DISTRICT OF COLUMBIA, ASSIGNOR TO JOHN G. SLATER, OF SAME PLACE.

MEANS FOR INSURING TRAVELERS AGAINST LOSS BY ACCIDENT.

SPECIFICATION forming part of Reissued Letters Patent No. 11,270, dated September 13, 1892.

Original No. 467,872, dated January 26, 1892. Application for reissue filed July 21, 1892. Serial No. 440,827.

*To all whom it may concern:*

Be it known that I, EZRA NATHANIEL HILL, a citizen of the United States, residing at Washington, in the District of Columbia, have invented certain new and useful Improvements in Means for Insuring Travelers Against Loss by Accident; and I hereby declare the following to be a full, clear, and exact description of the invention, such as will enable others skilled in the art to which it appertains to make and use the same, reference being had to the accompanying drawings, and the letters of reference marked thereon, which form a part of this specification.

My invention relates to a novel, useful, and improved means for insuring travelers and others against loss by accident; and to this end it consists in a newspaper or other periodical having the peculiarities in the construction and arrangement of some of its parts or features hereinafter fully described, and particularly pointed out in the claims.

The object of my invention is to provide a newspaper or other periodical having the name or title and address of the insurer, an issue-date, and columns for news and other interesting reading matter, and also for advertisements, with another column or space having one or more coupons, each containing a suitable heading for the name and address of an insurer, an accident-insurance policy specifying the time for and the amount of the insurance beyond which the insurer is not responsible, and a space-date, the same or subsequent to that of said periodical, whereby a traveler or other person who desires to become insured against loss by accident and who has obtained a copy of said newspaper or other periodical and have one or more of the coupons thereof stamped or dated not only thereby becomes insured for a stated period and for a specified amount by the insurer issuing or publishing the same, but is placed in possession of a periodical which has become an object or article of value which will therefore be likely to be carefully retained and probably thoroughly read, and which also thereby becomes a very desirable medium for disseminating information in regard to matters of trade and the like, whereby persons advertising in said periodical will receive assurance that their announcements will be read and carefully considered.

Figure 1:
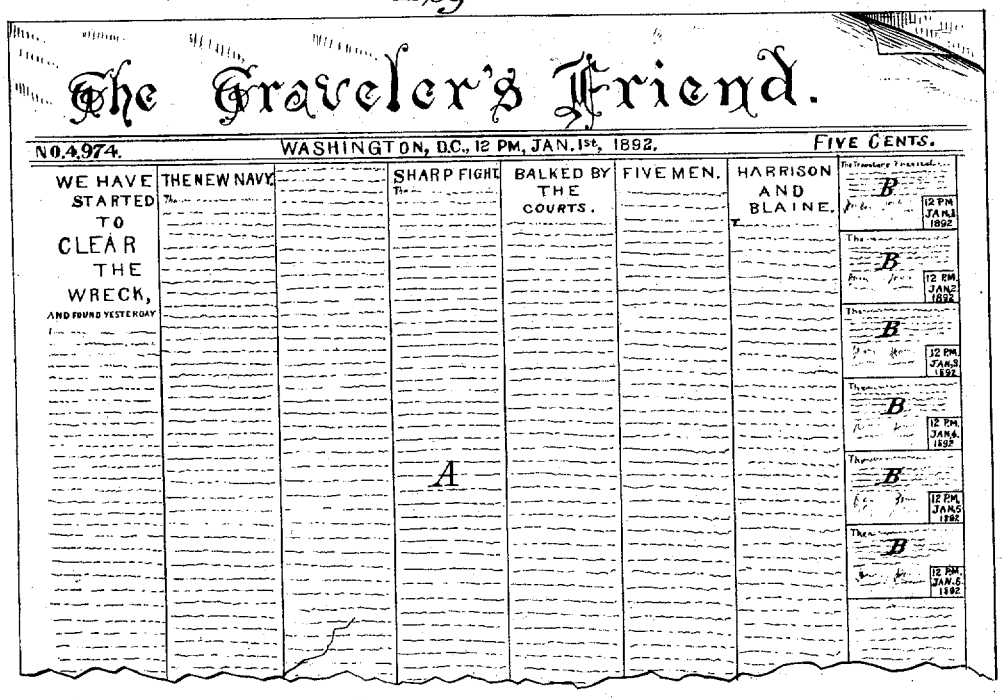
Figure 2:
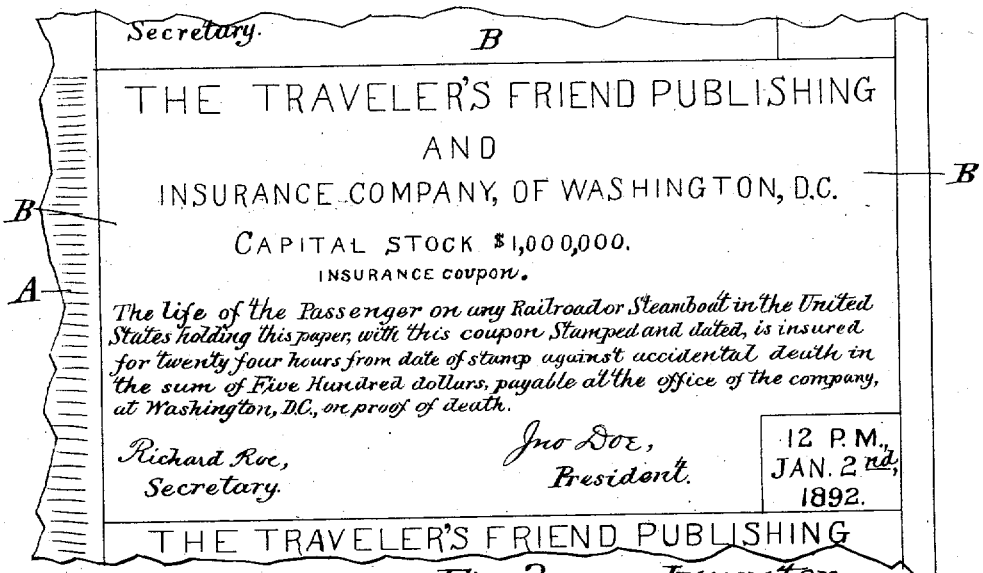

In the accompanying drawings, Figure 1 represents a newspaper or other periodical provided with my new, useful, and improved means for insuring travelers and others against loss by accident; and Fig. 2, an enlarged detail view of one of the coupons employed therein.

In the drawings, A indicates a newspaper or other periodical having a suitable name or title, address, and issue-date, and consisting of any number and size of sheets or pages which may contain any desirable or necessary number of columns for news and other interesting reading matter and also for advertisements. The column at the right edge of one of the pages of the periodical contains a series of coupons B, which are formed integrally with but may be made detachable from said periodical. Each of these coupons contains a suitable heading for the name and address of an insurer, an accident-insurance policy specifying the time for and the amount of the insurance beyond which the insurer is not responsible, and a space for receiving a date. These newspapers or periodicals A are dated as issued—viz., periodically—and the upper coupon B is stamped or dated the same as said periodical, while the lower ones bear dates subsequent thereto and to the coupon immediately above or preceding.

I have represented the periodical A as provided with a series of coupons arranged in the column at the right edge thereof, as formed integrally therewith and as having dated spaces at their lower right corners; but it is obvious that said coupons can be rendered detachable therefrom and that one or more of them can be arranged in any other suitable or desirable location in said periodical.

While I have thus described one means for the practical embodiment and use of my invention, it is evident that various modifications thereof will readily suggest themselves to those skilled in the art, and that such can be adopted or employed without departure from the principle underlying my invention.

Having thus fully described my invention, what I claim as new, and desire to secure by Letters Patent of the United States, is—

1. The herein-described means for insuring travelers and others against loss by accident, which consists of a newspaper or other periodical provided with a name or title, an address, and an issue-date and having one or more coupons containing the name of the insurer, and an accident-insurance policy specifying the time and amount beyond which the insurer is not responsible, substantially as described.

2. The herein-described means for insuring travelers and others against loss by accident, which consists of a newspaper or other periodical provided with a name or title, an address, and an issue-date and having one or more coupons containing a heading for the name and address of the insurer, and an accident-insurance policy specifying the time and amount beyond which the insurer is not responsible, substantially as described.

3. The herein-described means for insuring travelers and others against loss by accident, which consists of a newspaper or other periodical provided with a name or title, an address, and an issue-date and having a series of coupons, each containing a heading for the name and address of the insurer, a date-space, and an accident-insurance policy specifying the time and the amount beyond which the insurer is not responsible, substantially as described.

4. The herein-described means for insuring travelers and others against loss by accident, which consists of a newspaper or other periodical containing columns for news, attractive reading matter, and advertisements, and a series of coupons, each of which is provided with a heading for the name and address of the insurer, and an accident-insurance policy specifying the time and amount beyond which the insurer is not responsible, substantially as described.

5. The herein-described means for insuring travelers and others against loss by accident, which consists of a newspaper or other periodical containing columns for news, attractive reading matter, and advertisements, and a series of coupons, each of which is provided with the name of the insurer, an accident-insurance policy specifying the time for and the amount of the insurance, and a space dated the same as or subsequent to that of said periodical and to that upon the coupon immediately above or preceding, substantially as described.

In testimony whereof I affix my signature in presence of two witnesses.

EZRA NATHANIEL HILL.

Witnesses:
ELIZABETH B. BALDWIN,
FLETCHER JOHNSTON.